US006755470B2

(12) United States Patent
Iwata et al.

(10) Patent No.: US 6,755,470 B2
(45) Date of Patent: Jun. 29, 2004

(54) SEAT RECLINING APPARATUS FOR AUTOMOTIVE VEHICLE

(75) Inventors: Masahiro Iwata, Ichinomiya (JP); Atsushi Takano, Ogaki (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 0 days.

(21) Appl. No.: 10/354,976

(22) Filed: Jan. 31, 2003

(65) Prior Publication Data

US 2004/0004384 A1 Jan. 8, 2004

(30) Foreign Application Priority Data

Jul. 2, 2002 (JP) ........................................ 2002-193151

(51) Int. Cl.[7] ................................................ B60N 2/02
(52) U.S. Cl. .................... 297/362; 297/361.1; 297/374; 297/367; 297/369; 297/373
(58) Field of Search .............................. 297/362, 361.1, 297/374, 367, 369, 373; 192/223; 475/162, 175

(56) References Cited

U.S. PATENT DOCUMENTS

| | | | | |
|---|---|---|---|---|
| 5,154,475 A | * | 10/1992 | Kafitz | 297/362 |
| 5,586,833 A | * | 12/1996 | Vossmann et al. | 403/359.6 |
| 5,634,689 A | * | 6/1997 | Putsch et al. | 297/362 |
| 6,305,748 B1 | * | 10/2001 | Ohba | 297/362 |
| 6,543,851 B2 | * | 4/2003 | Schillak | 297/367 |
| 6,619,743 B1 | * | 9/2003 | Scholz et al. | 297/362 |
| 6,637,821 B2 | * | 10/2003 | Lee et al. | 297/362 |
| 2002/0050732 A1 | * | 5/2002 | Koga et al. | 297/362 |
| 2003/0060317 A1 | * | 3/2003 | Wang et al. | 475/162 |

FOREIGN PATENT DOCUMENTS

| | | |
|---|---|---|
| JP | 63-47443 | 9/1988 |
| JP | 2756516 | 3/1998 |

* cited by examiner

Primary Examiner—Peter M. Cuomo
Assistant Examiner—Sarah C. Burnham
(74) Attorney, Agent, or Firm—Jacobson Holman PLLC

(57) ABSTRACT

A seat reclining apparatus for an automotive vehicle which employs a differential transmission mechanism in which an inner gear and an outer gear having slightly smaller number of teeth than the inner gear are supported in their partly engaged states by a rotation shaft part and an eccentric shaft which is eccentric with respect to the rotation shaft, wherein the eccentric shaft part includes two wedge plates sandwichingly inserted between a bearing ring inner peripheral surface of the outer gear and a bearing cylinder outer peripheral surface of the inner gear when the seatback is in the fixed position, a spring rod for biasing the two wedge plates in opposite peripheral directions, and an operation piece part for releasing the sandwichingly inserting states of the wedge plates when the seatback is in the fixed position by being rotated together with the rotation shaft and rotated together with the wedge plates when the seatback is in an adjusting position, each of the wedge plates being in a crescent shape including an arcuate outer surface part which is slid into contact with the inner peripheral surface of the bearing ring and an arcuate inner surface part which is slid into contact with the outer peripheral surface of the bearing cylinder when the seatback is in the adjusting position, and each of the wedge plates being approximately 180 degrees or more in arcuate angle which is formed between the arcuate outer surface part and the arcuate inner surface part, the two wedge plates being arranged in an overlapping relation in the axial direction of the rotation shaft.

3 Claims, 5 Drawing Sheets

SEAT RECLINING APPARATUS FOR AUTOMOTIVE VEHICLE

BACKGROUND OF THE INVENTION

This invention relates to a seat reclining apparatus for an automotive vehicle and more particularly to an improvement of a seat reclining apparatus in which an inclination angle of a seatback is adjusted by a so-called differential transmission mechanism in which an inner gear partly engaged with an outer gear having smaller number of teeth than the inner gear is relatively swingingly rotated by movement of the engagement parts of the inner and outer gears and which is capable of eliminating rattling of the seatback when the inclination of the seatback is fixed and smoothly conducting engagement transmission between the inner gear and the outer gear when the seatback is in the adjusting position.

Japanese Patent Publication No. S63-47443 discloses one example which employs the so-called differential transmission mechanism as means for adjusting the inclination angle of a seatback in a seat reclining apparatus for an automotive vehicle.

This related art includes a rotation shaft (swinging shaft) which supports thereon one of an inner gear and an outer gear, and an eccentric shaft part (eccentric ring) which supports the other gear. The eccentric shaft part, which supports thereon one of the inner and our gears, comprises, in a space between an inner hole of this gear and the rotation shaft, a disc (interlocking disc) integral with the rotation shaft, two wedge pieces having tapered end parts which are arranged in opposite directions, and a spring interposed between opposing wide end parts of the two wedge pieces and for biasing the two wedge pieces in the pushing away directions. Moreover, those components are arranged on a same plane which is orthogonal to the rotation shaft.

In a state where the seatback is fixed at a desired angular position, the mutually oppositely directing wedge pieces are biased by the spring in a direction sandwichingly inserted and bitten between the circumferential range (area surrounding the rotation shaft) of the disc and the circumferential range of the inner hole of the gear. Thereby, the center of the rotation shaft and the center of the eccentric shaft part are brought away from each other (the amount of eccentricity is increased) and the inner gear and the outer gear are press contacted with each other at the engaging parts thereof. By this, rattling of the seatback caused by so-called engagement play is eliminated. At the time of adjustment of inclination of the seatback, a projection (interlocking projection) of the disc which rotates together with the rotation shaft, is abutted with the tapered end of the wedge piece to push the wedge piece against the biasing force of the spring. By this, the sandwichingly inserted and bitten state in the position fixed state is released to release the press contacted state at the engaging parts. Thus, the inner gear and the outer gear are brought into a smooth engagement transmission state. As a result, the inclination adjustment is made by relative swinging rotation between the inner gear and the outer gear caused by rotation of the rotation shaft and the eccentric shaft part.

As a technique related to the above-mentioned art, there is a technique disclosed by Official Gazette of Japanese Patent No. 2756516.

In the inclination angle adjustment means for an automotive vehicle seat by such a differential transmission mechanism, the smooth rotation transmission of the inner and outer gears is desirous for the adjustment of inclination of the seatback. For this purpose, the inner gear and the outer gear are engaged with each other through backlash (play between mutually engaging gears, hereinafter referred to as "engagement play").

However, this results in such inconveniences that in the desired inclination position (position fixed time) after adjustment, the backseat is vibrated caused by the above-mentioned engagement play. For this reason along with the manufacturing tolerance (hereinafter referred to as bearing space) of the supporting part of each gear, the seatback is heavily rattled, thereby giving an unpleasant feel to the person who sits on the vehicle seat. Moreover, this rattling is amplified when the shock is applied to the vehicle seat, thereby applying a significant adverse effect to the vehicle seat.

The above-mentioned related art (Japanese Patent Publication No. S63-47443) aims at solving the above inconveniences. It is designed such that a disc forming an eccentric shaft part as its main part, two wedge pieces and a spring are arranged on a same plane which is orthogonal to the rotation shaft.

This disc is, however, required to have a sufficiently large strength because it releases the sandwichingly inserting and biting action of the wedge pieces during the time the disc rotates together with the rotation shaft and pushes and rotates the wedge pieces so that the eccentric shaft part is brought into a rotating state to allow the rotation of the gears which are supported thereon. Since the disc occupies an arcuate angle range having a wide angle on the same plane which is orthogonal to the rotation shaft, one wedge piece takes an arcuate angle range having a narrow angle in consideration of a provision of the spring. Accordingly, it is in the form of a short piece defined by an arcuate inner side surface and an arcuate outer side surface in which one end is tapered and the other end is somewhat large in width.

In a state where the entire arcuate outer surface part of each wedge piece is in contact with the circumferential surface of the inner hole of the gear when the wedge piece is sandwichingly inserted and bitten when the seatback is in fixed position and the arcuate inner surface part is in contact at its one point with the disc outer peripheral surface (area surrounding the rotation shaft). Accordingly, since the load coming from the seatback is concentrated on the arcuate outer surface part having a narrow arcuate angle through one point of the arcuate inner surface part, there is a fear of escape of the wedge piece from the plane in the axial direction because of its arcuate short piece shape.

Moreover, when the seatback is in the fixed position, the sandwichingly inserting and biting action of the wedge piece is released, and the wedge piece is moved in accordance with rotation of the disc, thereby rotating the gear which is supported on this eccentric shaft part. However, the gear is rotated by sliding contact relation between the arcuate outer surface part of the wedge piece having a narrow arcuate angle and the circumferential surface of the inner hole of the gear while maintaining the amount of eccentricity between the rotation shaft part and the eccentric shaft part. Thus, along with the above-mentioned escape action caused by the load, unstableness is accompanied. In addition, since the amount of eccentricity is varied by the approaching/departing movement of the two wedge pieces caused by degree of expansion/contraction of the spring which is interposed between the two wedge pieces, proper engagement (backlash) between the outer gear and the inner gear is unobtainable, thus making it difficult to adjust the position of the seatback. Accordingly, those wedge pieces invite high surface pressure and increased degree of wear caused by load applicable within the narrow arcuate angle range when the seatback is in the fixed position and when the seatback is in the adjusting position, and by sliding contact. Thus, dynamic characteristics and durability are decreased. In order to obtain an adjustment mechanism having a large strength by overcoming those inconveniences, it is required that the various members including the wedge pieces are increased in precision and the entire apparatus is increased in size. This results in increase of the manufacturing process and various expenses.

As means for solving the inconveniences, there is known a device as disclosed in the above-mentioned Official Gazette of Japanese Patent No. 2756516.

This conventional device comprises a dick (engagement body) whose eccentric shaft part (eccentric part) is integral with the rotation shaft (swinging shaft), a spring (biasing force accommodating device), two wedge pieces (wedge parts) and a crescent-shaped centering part disposed at an area in the vicinity of the wedge pieces. The eccentric shaft part is surrounded by an inner hole (support hole) of the outer gear (one joint part, spur gear with an outer gear).

When the seatback is in the fixed position (non-operated position), rattling (play in the radial direction) caused by the sandwichingly inserting and biting action of the two wedge pieces is eliminated in the same manner as mentioned above. When the seatback is in the adjusting position (during adjusting motion), the inner hole of the outer gear is supported by the centering part. As seen, the action (function) is shared. By making the outer periphery of the centering part slide into contact with the inner periphery of the inner hole over the wide arcuate angle range, low surface pressure and wearing resistance can be obtained.

However, since this conventional art requires an additional member of the centering part, the cost and the number of assembling processes are increased. In addition, in order to exhibit the above function, a high degree of precision is required for the centering part which is slid into contact with the area surrounding the rotation shaft and the inner hole of the outer gear over a wide angle range so as to hold the outer gear. Moreover, in actual practice, since even a small error in dimensional relation between the centering part and the wedge pieces can make an intended effect unobtainable, precision management of those component parts is difficult to perform. Thus, inconveniences may occur at the time of a machining process and an assembling process.

SUMMARY OF THE INVENTION

It is, therefore, an object of the present invention to provide a new technique usable in a seat reclining apparatus for an automotive vehicle, which technique is capable of eliminating rattling of the seatback, which would otherwise occur due to sandwiching insertion and biting and withdrawal of an eccentric part which constitutes an eccentric shaft part when the seatback is in a fixed position, and capable of performing a smooth rotational transmission between the outer gear and the inner gear, and which technique has favorable load resistance and wear resistance.

The features of the present invention reside in a seat reclining apparatus for an automotive vehicle in which an inclination angle of a seatback with respect to a seat cushion is adjusted by a differential transmission mechanism in which an inner gear and an outer gear having slightly smaller number of teeth than the inner gear are supported in their partly engaged states by a rotation shaft part and an eccentric shaft which is eccentric with respect to the rotation shaft, wherein the eccentric shaft part includes two wedge plates sandwichingly inserted between a bearing ring inner peripheral surface which corresponds to a center hole of the outer gear and a bearing cylinder outer peripheral surface of the inner gear when the seatback is in a fixed position, a spring rod for biasing the two wedge plates in opposite peripheral directions that are coincident with the sandwichingly inserting direction, and an operation piece part for releasing the sandwichingly inserting states of the wedge plates when the seatback is in the fixed position by being rotated together with the rotation shaft and rotated together with the wedge plates when the seatback is in an adjusting position, each of the wedge plates being in a generally crescent shape including an arcuate outer surface part which is slid into contact with the inner peripheral surface of the bearing ring and an arcuate inner surface part which is slid into contact with the outer peripheral surface of the bearing cylinder when the seatback is in an adjusting position, the two wedge plates being arranged in an overlapping relation in the axial direction of the rotation shaft. The wedge plates are each approximately 180 degrees, or 180 degrees or more in arcuate angle which is formed between the arcuate outer surface part and the arcuate inner surface part.

BEST MODE FOR CARRYING OUT THE INVENTION

Figure 1:
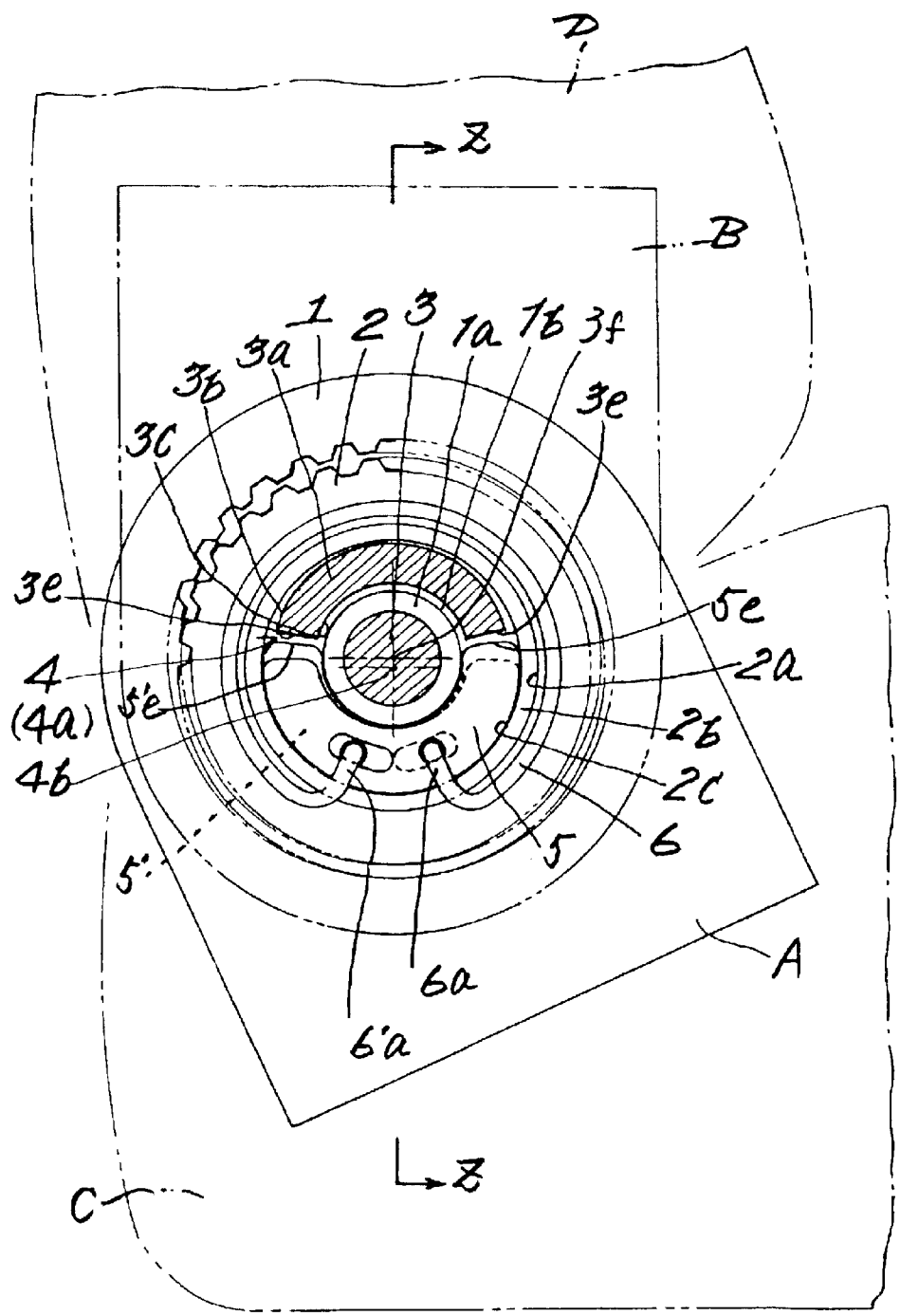
FIG. 1 is a front view, partly cutaway, of a seat reclining apparatus.
Figure 2:
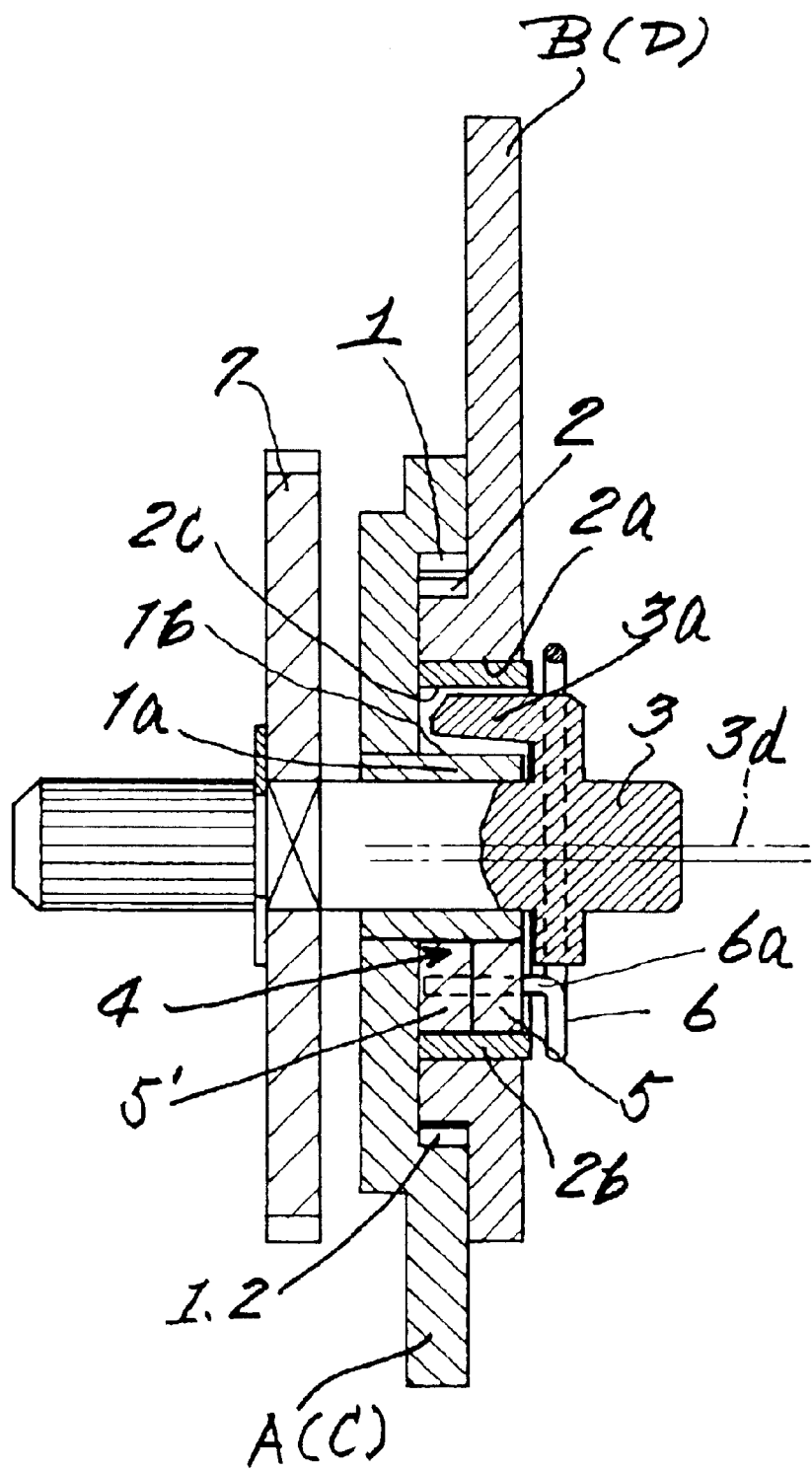
FIG. 2 is a sectional view taken on line Z—Z of FIG. 1.

A seat reclining apparatus according to this embodiment is designed such that the inclination angle of a seatback with respect to a seat cushion is adjusted by a differential transmission mechanism which is disposed between a bracket on the transmission side and a bracket on the seatback side. This differential transmission mechanism is designed such that an inner gear and an outer gear having slightly smaller number of teeth than the inner gear are rotatably supported by a rotation shaft and an eccentric shaft part which is eccentric with respect to the rotation shaft in such a manner as to be partly engaged with each other, and the inner gear and the outer gear are relatively swingingly rotated by turning movement of the engaged parts thereof in accordance with rotation of the rotation shaft.

In this embodiment, an inner gear 1 is formed at a bracket A which is located on the side of a seat cushion C, and an outer gear 2 having a slightly smaller number of teeth than the inner gear 1 is formed at a bracket B which is located on the side of a seatback C. The inner gear 1 and the outer gear 2 are disposed in partly engaged with each other such that a bearing cylinder 1a located at a central part of the inner gear 1 and serving as an area surrounding a rotation shaft 3 is rotatably fitted to the rotation shaft 3 and a bearing ring 2b fitted to a center hole 2a is rotatably fitted to an eccentric shaft part 4 which surrounds the bearing cylinder 1a of the inner gear 1.

An eccentric shaft part 4, which supports the outer gear 2, includes an operation piece part 3a, two wedge plates 5, 5' and a segmental arch-shaped spring rod 6, which are disposed at an eccentric space 4a which is formed between a bearing cylinder outer peripheral surface 1b of the inner gear 1 which is decentered in such a manner as to correspond to the difference in number of teeth between the inner gear 1 and the outer gear 2 and a bearing ring inner peripheral surface 2c of the outer gear 2 and adapted to properly engaging the inner gear 1 and the outer gear 3 with each other in such a manner as to have a backlash when the inclination angle of the seatback D is to be adjusted (hereinafter referred to as "when the seatback is in the adjusting position") and also adapted to press engage the inner gear 1 and the outer gear 2 with each other at their engaging parts when the seatback D is in a desired inclination angle position (hereinafter referred to as "when the seatback is in the fixed position").

This will be described with reference to FIGS. 1 and 4 which show a state when the seatback is in the fixed position. The operation piece part 3a in the eccentric shaft part 4 is integral with the rotation shaft 3 and is in the form of an arcuate collar having an arcuate angle of approximately 150 degrees which is formed between the outer peripheral side surface part 3b of the bearing ring inner peripheral surface 2c and the inner peripheral side surface part 3c along the bearing cylinder outer peripheral surface 1b. The operation piece part 3a is disposed at an opposite part with respect to the decentering direction in the eccentric space 4a (eccentric shaft part 4a).

Figure 3:
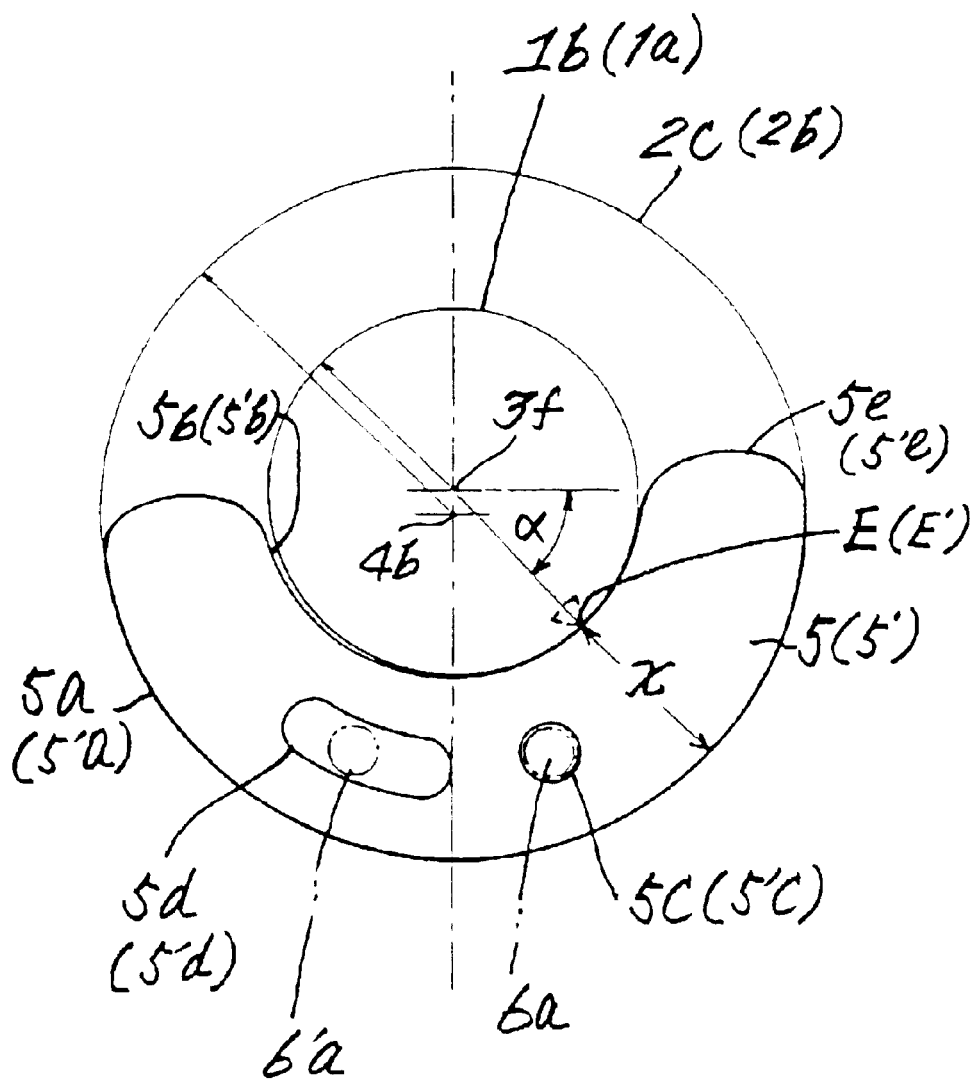
FIG. 3 is a front view of a wedge plate.

The two wedge plates 5, 5' are in the same configuration. One wedge plate 5 or 5' (FIG. 3) is in the form of a generally crescent plate having an arcuate angle of approximately 180 degrees and includes an arcuate outer surface part 5a which is in an arcuate form having a same diameter as that of the bearing inner peripheral surface 2c and which is slid into contact with the inner peripheral surface 2c, and an arcuate inner surface part 5b which is in an arcuate form having a slightly larger diameter as that of the bearing cylinder outer peripheral surface 1b and which is slid into contact with the outer peripheral surface 1b. It has a lock hole 5c for a segmental arch-shaped spring rod 6 and an arcuate hole 5d which are arranged in a row on a concentric circle at its generally central part. The two wedge plates 5, 5' of the same configuration are arranged in an overlapped relation in the direction of the axis 3d of the rotation shaft 3 at the decentering direction part in the eccentric space 4a (eccentric shaft part 4) such that they are directed in the opposite directions just as in the case where one 5' of them is turned over.

The segmental arch-shaped spring rod 6 includes leg rod parts 6a, 6'a which are formed being bent at generally right angles with respect to the segmental arch-shaped surface from end parts of the segmental arch-shaped part. The leg rod parts 6a, 6'a are arranged along the front surface of the bearing ring 2b such that the led rod part 6a is locked to the lock hole 5c of that wedge plate 5 of the overlapped wedge plates 5, 5' and inserted in the arcuate hole 5'd of the other wedge plate 5'. The other leg rod part 6'a is inserted in the arcuate hole 5d of the wedge plate 5 and locked to the lock hole 5'c.

Owing to the above arrangement, the two wedge plates 5, 5' are biased in the opposite peripheral directions by the diameter-enlarging resilient force of the segmental arch-shaped spring rod 6 through the leg rod parts 6a, 6'a which are locked to the lock holes 5c, 5'c, respectively. In the state where the seatback is in the fixed position as shown in FIGS. 1 and 4, the wedge plate 5 on this side is biased in the counterclockwise direction and the other wedge plate 5' is biased in the clockwise direction so that they are sandwichingly inserted between the bearing cylinder outer peripheral surface 1b and the bearing ring inner peripheral surface 2c in the left and right directions, respectively. The wedge plates 5, 5' are bitten between the bearing cylinder outer peripheral surface 1b and the bearing ring inner peripheral surface 2c with entire surfaces of the arcuate outer surface parts 5a, 5'a being in contact with the bearing ring inner peripheral surface 2c having the same diameter, and with about ¾ parts E, E' of the arcuate inner surface parts 5b, 5'b in the sandwichingly inserting direction being in contact with the bearing cylinder outer peripheral surface 1b. The end face parts 5e, 5'e of the wedge plate 5, 5' in the biasing direction and the end face part 3e of the operation piece part 3a are placed opposite to each other with a small interval.

By the wedge plates 5, 5' sandwichingly inserted and bitten between the bearing cylinder outer peripheral surface 1b serving as an area surrounding the rotation shaft 3 and the bearing ring inner peripheral surface corresponding to the center hole 2a of the outer gear 2, both the peripheral surfaces 1b, 2c, i.e., the center 3f of the rotation shaft 3 and the center 4b of the eccentric shaft part 4 are pushed in the opposite decentering directions (increase F in amount of eccentricity). By this, the inner peripheral surface of the bearing cylinder 1a is press contacted with the outer peripheral surface of the rotation shaft 3 and also press contacted with the teeth of the outer gear 2 and the inner gear 1 at their engaged parts. This eliminates rattling of the seatback D which would otherwise occur due to the space surrounding the rotation shaft 3 which supports the inner gear 1, the bearing gaps (manufacturing tolerances) of the respective axial support parts at the eccentric shaft part 4 which supports the outer gear 2 and the engagement play (backlash) which is required for proper engagement for rotation transmission.

When the seatback is in the fixed position, the contact points E, E' between the respective arcuate inner surface parts 5b, 5'b and the bearing cylinder outer peripheral surface 1b are preferably located in a range where the depression angle α from the center (center 3f of the rotation shaft 3) of the bearing cylinder 1a is in the range of from 35 degrees to 50 degrees. If the depression angle α becomes small, the sandwichingly inserting and biting force of the wedge plates 5, 5' is decreased, and if the angle α becomes large, the sandwichingly inserting and biting action and the releasing action thereof may occur even by a small amount of movement. To attain the above-mentioned positional range, an arcuate shape is preferable where the radial dimension X of the wedge plate 5 is maximum, though slightly, at the contact point E and gradually decreased towards the opposite end parts.

In this embodiment, although the two wedge plates have the same configuration and one of them is turned over for use, those limitations are not essentially required. The arcuate angle is not limited, either.

The adjustment of the inclination position of the seatback in the state where the seatback is in the fixed position is performed by rotating the rotation shaft 3 by means of a motor (not shown), the direction of rotation of which is controlled in accordance with a desired inclination direction (forward inclination or backward inclination) of the seatback D, through a gear 7.

Figure 4:
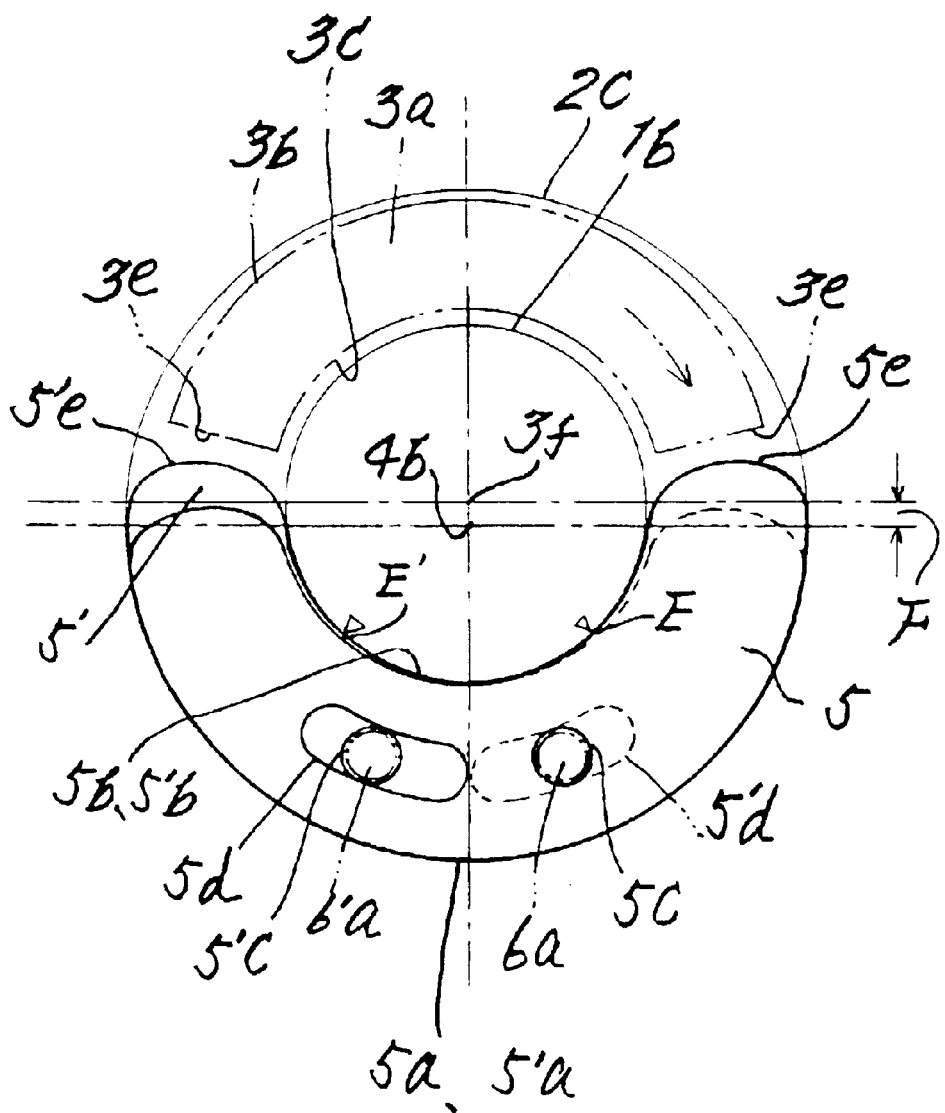
FIG. 4 is a simplified front view of an eccentric shaft part when in a fixed position.
Figure 5:
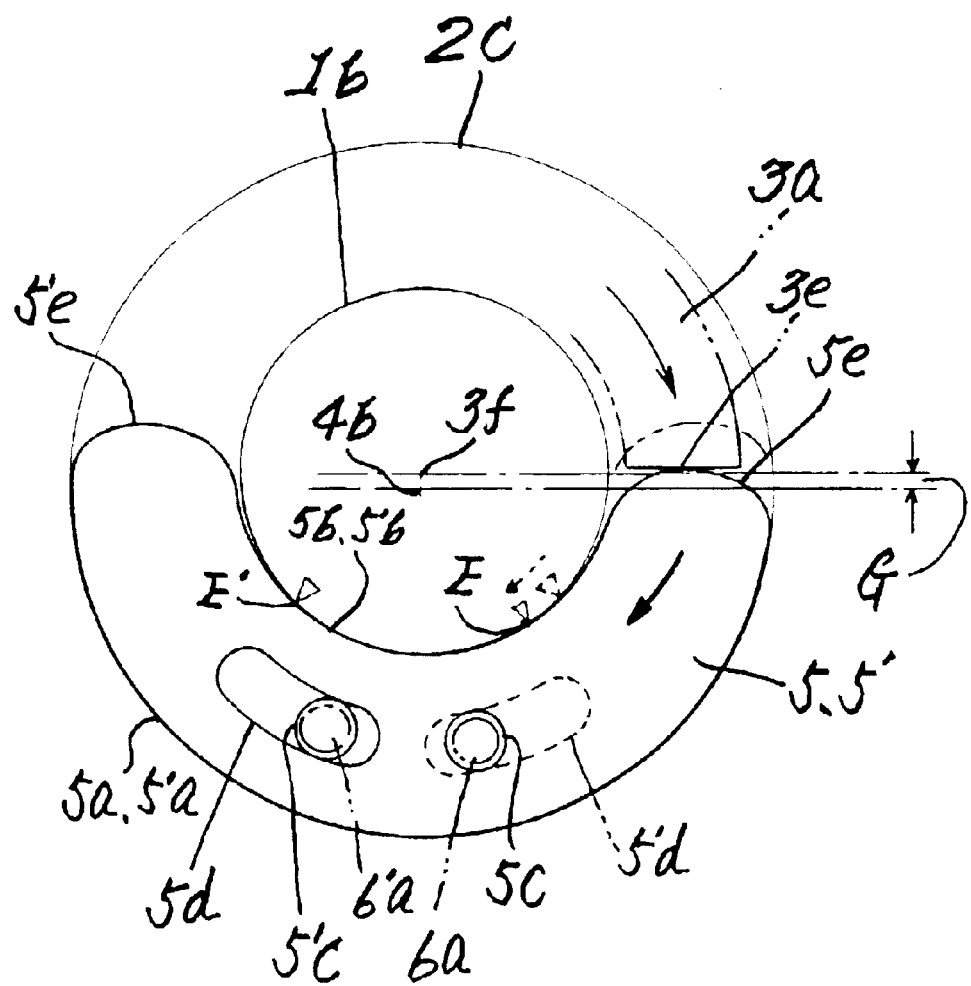
FIG. 5 is a simplified front view of the eccentric shaft part when the seatback is in an adjusting position.

For example, as shown in FIGS. 4 and 5, when the rotation shaft 3 is rotated in the clockwise direction, the operation piece part 3a which is integral with the rotation shaft 3 is also rotated in the same direction. As a result, the end face part 3e of the rotation shaft 3 in the rotating direction is brought into abutment with the end face part 5e of the wedge plate 5 and pushes the end face part 5e. By this pushing, the wedge plate 5, which has been biased in the sandwichingly inserting and biting direction by the segmental arch-shaped spring rod 6, is pushed and moved in the peripheral direction (clockwise direction) against the biasing force of the spring rod 6, thereby withdrawing the wedge plate 5 from the sandwichingly inserted and bitten position. Moreover, the operation piece part 3a is further brought into abutment with the end face part of the other wedge plate 5' to push the two wedge plates 5, 5' in their overlapped relation.

By movement of the wedge plate 5, i.e., by displacement of the contact point E, the pressure contact at the bearing gap and the pressure contact engagement state at the engaged parts when the seatback is in the fixed position, are released. As a result, the entire surfaces of the arcuate outer surface parts 5a, 5'a of the overlapped wedge plates 5, 5' are slid into contact with the bearing ring inner peripheral surface 2c through the arcuate inner surface parts 5b 5'b which are in contact with the bearing cylinder 1b. Then, the eccentric shaft part 4 is rotated about the rotation shaft 3 together with the operation piece part 3a and the segmental arch-shaped spring rod 6 while maintaining a proper decentering amount G which is required for proper engagement play (backlash) in a smooth rotational transmission of the inner gear 1 and the outer gear 2.

By this, the outer gear 2 which is supported by the eccentric shaft part 4 is rotated to allow the turning movement of its engagement part with respect to the inner gear 1. By this turning movement, the bracket B on the side of the seatback D where the outer gear 2 is formed, is adjusted in angle of inclination with respect to the bracket A on the side of the transmission C where the inner gear 1 is formed.

In the reclining apparatus for an automotive vehicle thus constructed, the wedge plate 5 at the eccentric shaft part 4 has an arcuate angle of about 180 degrees, or 180 degrees or more. Moreover, two of such wedge plates (5, 5') are arranged in an overlapped relation in the direction of the axis 3d of the rotation shaft 3.

In the state where the wedge plates 5, 5' are in sandwichingly inserted and bitten positions when the seatback D is in the fixed position, the entire surfaces of the arcuate outer surface parts 5a, 5'a are contacted with and push the bearing ring inner peripheral surface 2c, and they support thereon the seatback D. Accordingly, rattling, which would otherwise occur due to engagement play between the inner gear 1 and the outer gear 2, can be eliminated. Moreover, with respect to the shock load applicable to the seatback D, the two wedge plates 5, 5' are not escaped in the axial direction and they withstand the shock load in a stable manner. Moreover, since this load is dispersed in a wide range, the surface pressure is also decreased. In addition, when the seatback is in the adjusting position, since the entire surfaces of the arcuate outer surface parts 5a, 5'a of the two wedge plates 5, 5' are slid into contact with the bearing ring inner peripheral surface 2c which corresponds to the center hole 2a of the outer gear 2, the load at the time of adjustment is also dispersed to reduce the sliding resistance. Since this makes it possible to maintain the decentering amount G which is required for proper engagement play (backlash) between the inner gear 1 and the outer gear 2, the adjustment of inclination position of the seatback D is performed smoothly. Thus, the apparatus according to the present invention is excellent in load resistance and wear resistance, i.e., excellent in dynamic characteristics and durability.

What is claimed is:

1. A seat reclining apparatus for an automotive vehicle in which an inclination angle of a seatback with respect to a seat cushion is adjusted by a differential transmission mechanism in which an inner gear and an outer gear having slightly smaller number of teeth than said inner gear are supported in their partly engaged states by a rotation shaft part and an eccentric shaft part which is eccentric with respect to said rotation shaft, wherein said eccentric shaft part includes two wedge plates inserted in a sandwiched relationship between a bearing ring inner peripheral surface which corresponds to a center hole of said outer gear and a bearing cylinder outer peripheral surface of said inner gear when said seatback is in a fixed position, a spring rod for biasing said two wedge plates such that one of the wedge plates is biased in the opposite peripheral direction to the other wedge plate in said sandwiched relationship, and an operation piece part for releasing the sandwichingly inserting states of said wedge plates when said seatback is in the fixed position by being rotated together with said rotation shaft part and rotated together with said wedge plates when said seatback is in an adjusting position, each of said wedge plates being in a generally crescent shape including an arcuate outer surface part which is slid into contact with the inner peripheral surface of said bearing ring and an arcuate inner surface part which is slid into contact with the outer peripheral surface of said bearing cylinder when said seatback is in an adjusting position, said two wedge plates being arranged in an overlapping relation in an axial direction of said rotation shaft part.

2. A seat reclining apparatus for an automotive vehicle according to claim 1, wherein said arcuate outer surface part and said arcuate inner surface part are each in the form of a 180 degree arc.

3. A seat reclining apparatus for an automotive vehicle according to claim 1, wherein said arcuate outer surface part and said arcuate inner surface part are each in the form of an arc of 180 degree or more.

* * * * *